(12) United States Patent
Liu

(10) Patent No.: US 10,801,660 B1
(45) Date of Patent: Oct. 13, 2020

(54) SUPPORT FRAME

(71) Applicant: C.D. Great Furniture Co., Ltd., Taichung (TW)

(72) Inventor: Tseng-Lang Liu, Taichung (TW)

(73) Assignee: C.D. GREAT FURNITURE CO., LTD., Taichung (TW)

( * ) Notice: Subject to any disclaimer, the term of this patent is extended or adjusted under 35 U.S.C. 154(b) by 0 days.

(21) Appl. No.: 16/383,654

(22) Filed: Apr. 14, 2019

(51) Int. Cl.
| F16M 11/12 | (2006.01) |
| F16M 11/18 | (2006.01) |
| F16M 11/04 | (2006.01) |
| F16M 11/08 | (2006.01) |
| F16M 11/10 | (2006.01) |

(52) U.S. Cl.
CPC ......... F16M 11/126 (2013.01); F16M 11/045 (2013.01); F16M 11/046 (2013.01); F16M 11/08 (2013.01); F16M 11/10 (2013.01); F16M 11/18 (2013.01); F16M 2200/065 (2013.01); F16M 2200/066 (2013.01)

(58) Field of Classification Search
CPC .. F16M 11/126; F16M 11/045; F16M 11/046; F16M 11/08; F16M 11/10; F16M 11/18; F16M 2200/065; F16M 2200/066
USPC .......................................... 248/371, 917–923
See application file for complete search history.

(56) References Cited

U.S. PATENT DOCUMENTS

| 3,311,340 | A | * | 3/1967 | Riis | F16M 11/10 248/280.11 |
| 4,082,244 | A | * | 4/1978 | Groff | A61G 15/16 248/280.11 |
| 7,364,127 | B2 | * | 4/2008 | Huang | F16M 11/10 248/276.1 |
| 7,510,155 | B2 | * | 3/2009 | Huang | F16M 11/10 248/278.1 |
| 7,810,773 | B2 | * | 10/2010 | Chi | F16M 11/2064 248/121 |
| 8,070,114 | B2 | * | 12/2011 | Chen | F16M 11/14 248/121 |
| 8,720,838 | B2 | * | 5/2014 | Bowman | F16M 11/18 248/280.11 |
| 8,931,748 | B2 | * | 1/2015 | Bowman | F16M 11/10 248/280.11 |
| 9,004,431 | B2 | * | 4/2015 | Huang | F16M 11/10 248/282.1 |
| 9,033,292 | B2 | * | 5/2015 | Lu | F16M 13/022 248/123.11 |
| 9,316,346 | B2 | * | 4/2016 | Lau | F16M 11/126 |
| 9,752,723 | B2 | * | 9/2017 | Hung | F16M 13/02 |
| 10,274,131 | B2 | * | 4/2019 | Petts | F16M 11/043 |

(Continued)

*Primary Examiner* — Nkeisha Smith
(74) *Attorney, Agent, or Firm* — Bruce Stone LLP; Joseph A. Bruce

(57) ABSTRACT

A support frame includes: a base; a pivot block with a first pivot hole and a second pivot hole; a first strut having a first end portion and an opposite second end portion, wherein the first end portion is pivotally connected to the second pivot hole; an elastic member sleeved on the first strut; a hanging mount pivotally connected to the second end portion; and a second strut having one end pivotally connected to the base and another end pivotally connected to the hanging mount. The first sliding member and the second sliding member on the pivot block pivot on equal degrees, which solves the problem that the spring is overly stretched and easily gets fatigued, thereby improving the durability of the spring.

4 Claims, 7 Drawing Sheets

(56) References Cited

U.S. PATENT DOCUMENTS

| | | | | |
|---|---|---|---|---|
| 10,317,058 B2* | 6/2019 | Hung | ................. | F21V 21/28 |
| 10,400,946 B2* | 9/2019 | Bennett | ............. | F16M 11/2092 |
| 10,422,468 B2* | 9/2019 | Bowman | ............ | F16M 11/2064 |
| 10,480,709 B1* | 11/2019 | Chumakov | ............ | F16M 11/24 |
| 2005/0205734 A1* | 9/2005 | Wang | ................ | F16M 11/2064 |
| | | | | 248/276.1 |
| 2010/0327129 A1* | 12/2010 | Chen | ................ | F16M 11/14 |
| | | | | 248/121 |
| 2011/0260017 A1* | 10/2011 | Monsalve | ......... | F16M 11/2014 |
| | | | | 248/201 |
| 2012/0267497 A1* | 10/2012 | Bowman | ............... | F16M 11/10 |
| | | | | 248/280.11 |
| 2014/0131531 A1* | 5/2014 | Zimmer | ............ | A47G 29/1216 |
| | | | | 248/127 |
| 2015/0342351 A1* | 12/2015 | Hung | ................ | G06F 1/1601 |
| | | | | 211/26 |
| 2019/0219220 A1* | 7/2019 | Chou | ............... | F16M 11/2064 |

* cited by examiner

SUPPORT FRAME

BACKGROUND

Field of the Invention

The present invention relates to a support frame, and more particularly to the improvement of the support frame.

Related Prior Art

Generally, a support frame for hanging a screen essentially has a strut and a base, wherein the strut has one end for hanging the screen, and the other end pivotally coupled with the base. To adjust the height of the screen, the user can pull the strut to make it pivoted about the base, thereby achieving the effect of adjusting the height of the screen.

In particular, a spring is connected to the strut to support the strut. The spring has two ends fixed to the strut and the base, respectively. When the strut is pivoted, the spring can strut to prevent that the strut cannot be positioned due to the weight of the screen.

However, each time the strut pivots, the spring is elongated or shortened according to the angle at which the strut pivots. The greater the angle at which the strut pivots, the more the spring is stretched.

It is worth noting that when the spring is repeatedly stretched, it is likely to cause elastic fatigue, which in turn results in that the spring is unable to support the weight of the screen hanging on the strut. In particular, the more the spring is stretched, the more likely the spring is fatigued. In view of this, it is indeed necessary to solve the defect that the spring is greatly stretched repeatedly every time the strut pivots.

The present invention has arisen to mitigate and/or obviate the afore-described disadvantages.

SUMMARY

One objective of the present invention is to solve the problem that the spring is overly stretched and easily gets fatigued, thereby improving the durability of the spring.

To achieve the above objective, a support frame provided by the present invention comprises:

a base;

a pivot block having a first pivot hole and a second pivot hole, and being pivotally connected to the base via the first pivot hole;

a first strut having a first end portion and an opposite second end portion, wherein the first end portion is pivotally connected to the pivot block via the second pivot hole;

an elastic member sleeved on the first strut;

a hanging mount pivotally connected to the second end portion; and a second strut having one end pivotally connected to the base and another end pivotally connected to the hanging mount.

In a preferred embodiment, the elastic member is a contraction spring.

In a preferred embodiment, the first strut has a sleeve and a telescopic member, the sleeve has a sleeve hole extending along a telescopic direction and having an open end, the telescopic member is movably disposed in the sleeve hole along the telescopic direction, and the first end of the first strut is pivotally connected to the pivot block via the second pivot hole.

In a preferred embodiment, a first sliding member is provided in the first pivot hole and pivotally disposed on the base, and a second sliding member is disposed in the second pivot hole.

In a preferred embodiment, each of the first sliding member and the second sliding member is a bearing.

In a preferred embodiment, the base has a bottom member placed on a table top or fixed to a wall surface, and a pivoting member, the bottom member has a top surface facing the pivoting member, the top surface has an annular groove, the pivoting member has a bottom surface facing the bottom member, the bottom surface is provided with a positioning hole, a positioning post has one end inserted into the positioning hole and another end inserted into the annular groove.

Since the second strut and the first strut are connected to the base at different pivoting positions and also at different pivoting positions to the hanging mount, the pivoting position of the first strut is restricted by the second strut, so that when the second strut is pivoted, the first sliding member and the second sliding member on the pivot block will pivot on equal degrees.

More preferably, with the first and second sliding members, the process of rotating the first strut is smoothed, thereby preventing over rotation of the first strut caused by excessive force during rotation, maintaining the performance of the elastic member in a more excellent condition.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1:
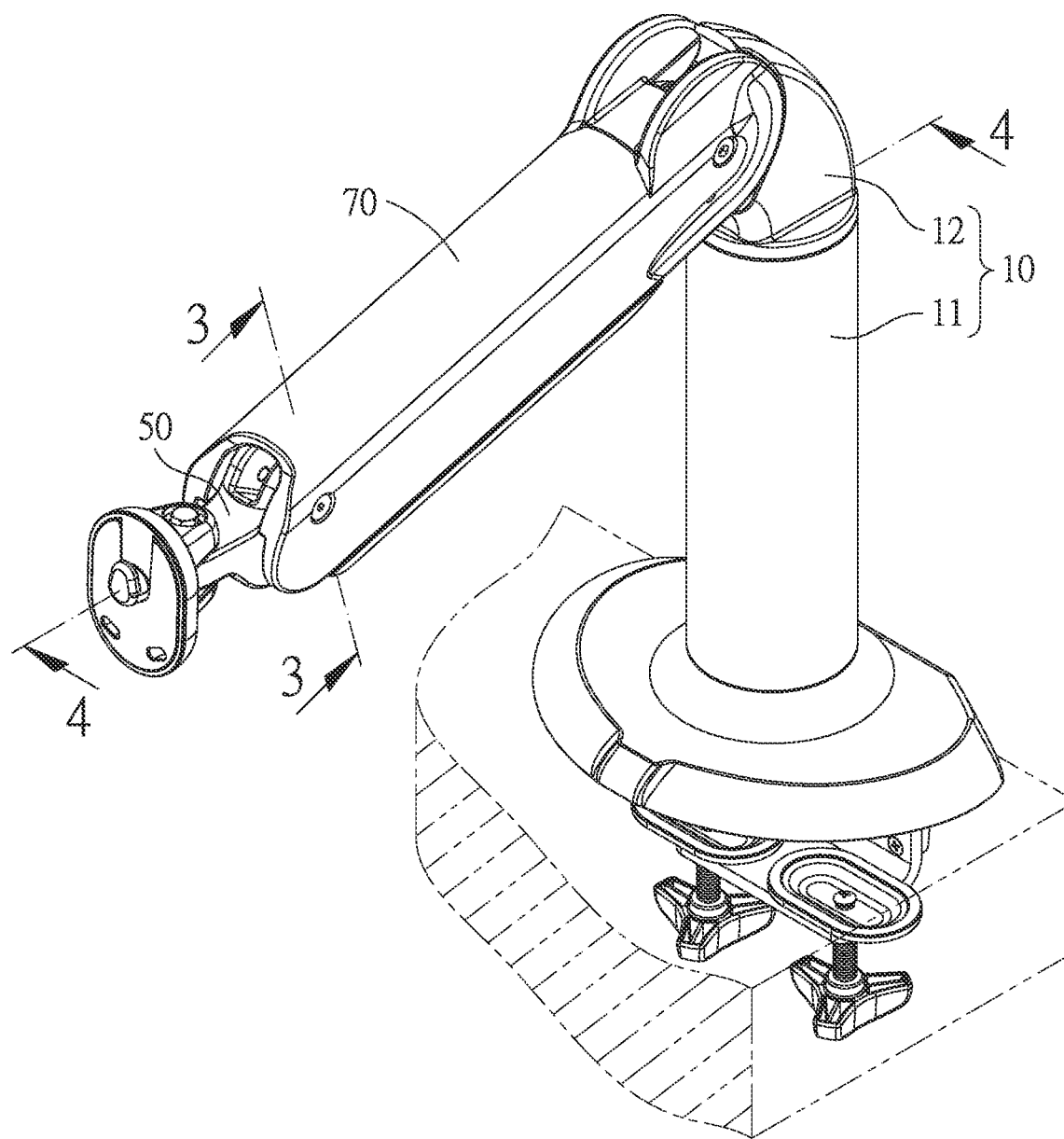
FIG. 1 is a perspective view of the support frame of the present invention in a preferred embodiment.
Figure 2:
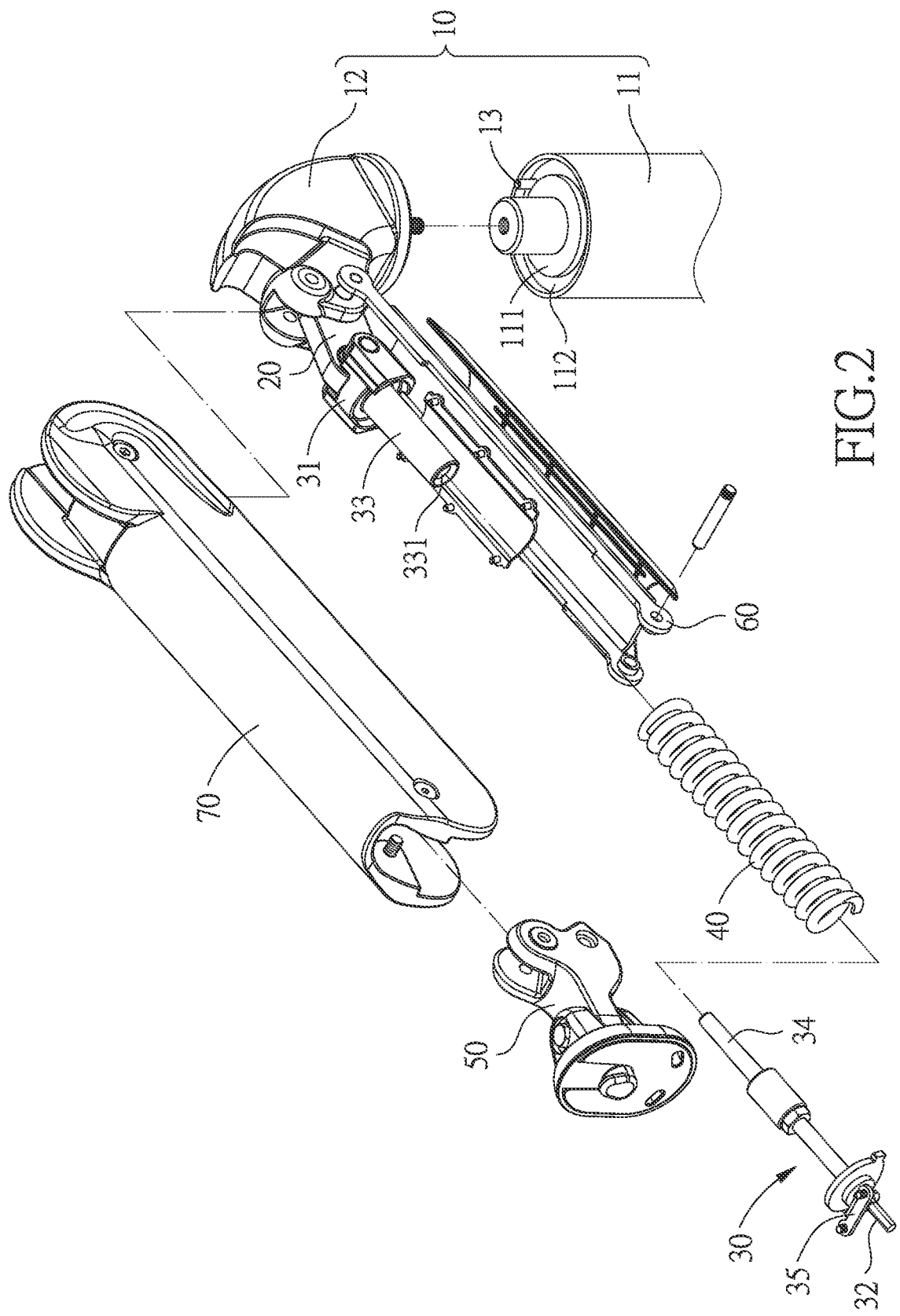
FIG. 2 is an exploded view of the support frame of the present invention in a preferred embodiment.
Figure 3:
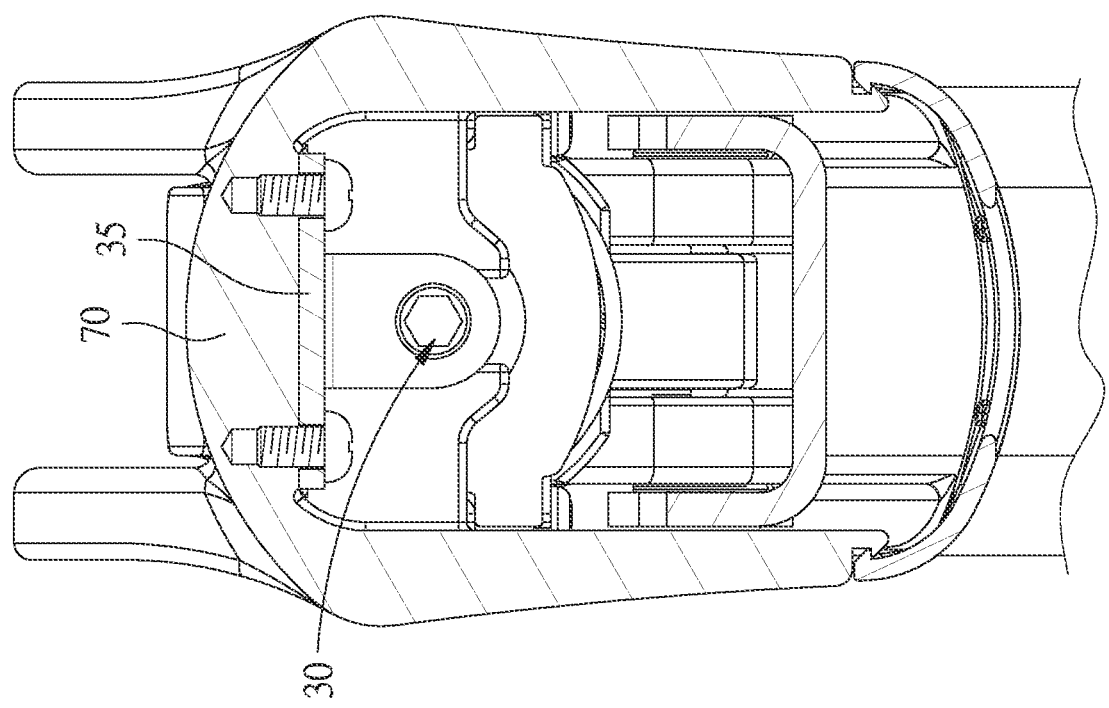
FIG. 3 is a cross-sectional view taken along line 3-3 of FIG. 1.
Figure 4:
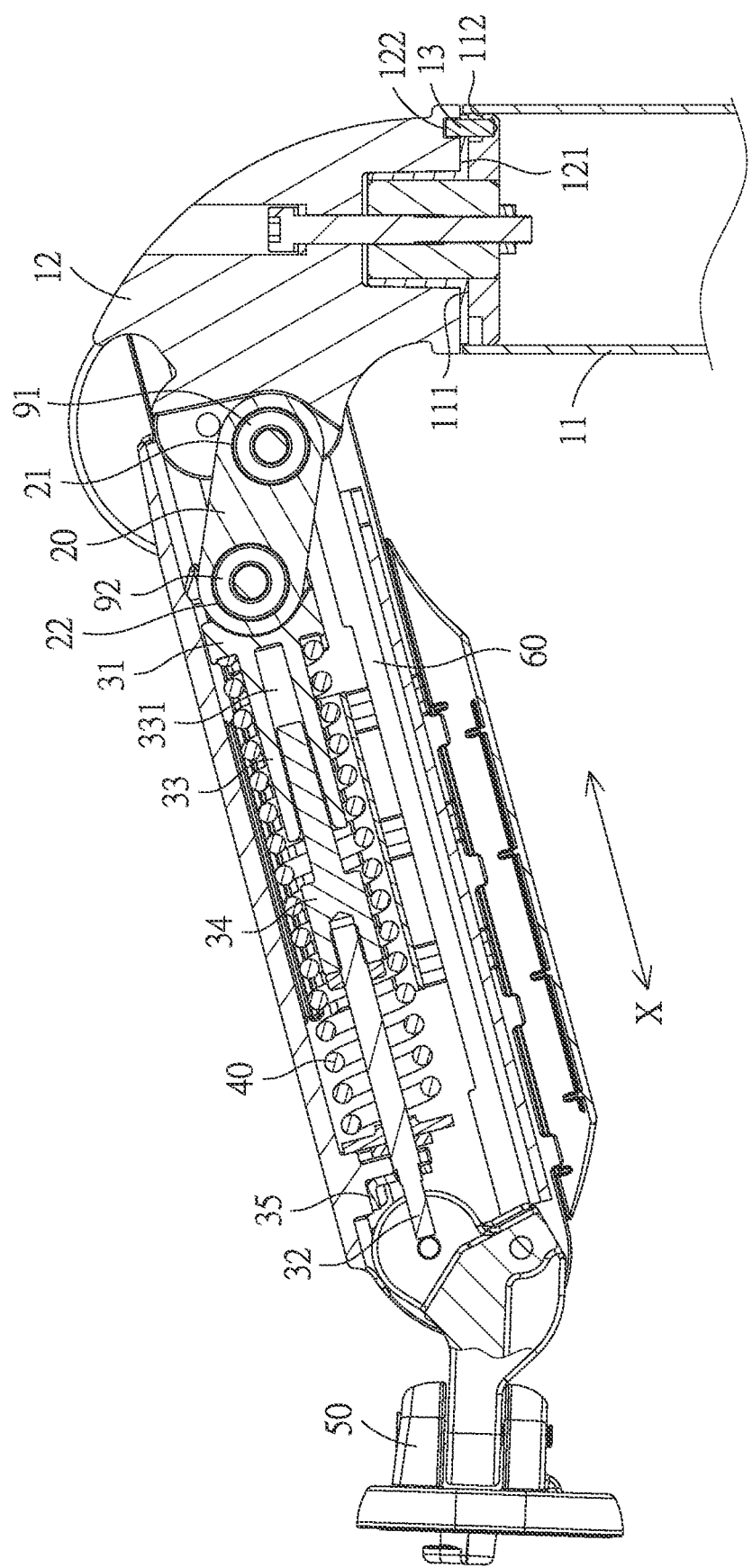
FIG. 4 is a cross-sectional view taken along line 4-4 of FIG. 1.

The present invention will be clearer from the following description when viewed together with the accompanying drawings, which show, for purpose of illustrations only, the preferred embodiment in accordance with the present invention.

Referring to FIGS. 1-6, a support frame in accordance with the present invention comprises: a base 10, a pivot block 20, a first strut 30, an elastic member 40, a hanging mount 50, and a second strut 60.

The pivot block 20 has a first pivot hole 21 and a second pivot hole 22. A first sliding member 91 is provided in the first pivot hole 21 and pivotally disposed on the base 10. A second sliding member 92 is disposed in the second pivot hole 22. In this embodiment, the first sliding member 91 and the second sliding member 92 are respectively a bearing, since the first and second sliding members 91 are a bearing, the pivot block 20 can be smoothly and pivotally connected to the base 10.

The first strut 30 has a first end portion 31 and an opposite second end portion 32. The first end portion 31 is pivotally connected to the second pivot hole 22 through the second sliding member 92.

The elastic member 40 is sleeved on the first strut 30. In this embodiment, the elastic member 40 is a contraction spring.

The hanging mount 50 is pivotally connected to the second end portion 32. In this embodiment, the hanging mount 50 is used for hanging heavy objects such as a screen.

The second strut 60 has one end pivotally connected to the base 10 and another end pivotally connected to the hanging mount 50.

Preferably, the first strut 30 has a sleeve 33 and a telescopic member 34. The sleeve 33 has a sleeve hole 331 extending along a telescopic direction X and having an open end. The telescopic member 34 is movably disposed in the sleeve hole 331 along the telescopic direction X, and the first strut 30 has the first end 31 pivotally connected to the pivot block 20 via the second pivot hole 22, so that the first strut 30 is able to extend and retract along the telescopic direction X.

In this embodiment, the base 10 has a bottom member 11 placed on a table top or fixed to a wall surface, and a pivoting member 12. The bottom member 11 has a top surface 111 facing the pivoting member 12. The top surface 111 has an annular groove 112, and the pivoting member 12 has a bottom surface 121 facing the bottom member 11. The bottom surface 121 is provided with a positioning hole 122. A positioning post 13 has one end inserted into the positioning hole 122 and another end inserted into the annular groove 112. With the positioning post 13, the pivoting member 12 is able to rotate in the opening direction of the annular groove 112.

This embodiment further includes an outer casing 70 which has two ends pivotally connected to the hanging mount 50 and the base 10, respectively. A connecting portion 35 is protruded from the first strut 30 and fixed to the outer casing 70, thereby making the first strut 30 more stable, and the outer casing 70 is disposed on the first strut 30 and the second strut 60 for protecting the first strut 30 and the second strut 60.

Figure 5:
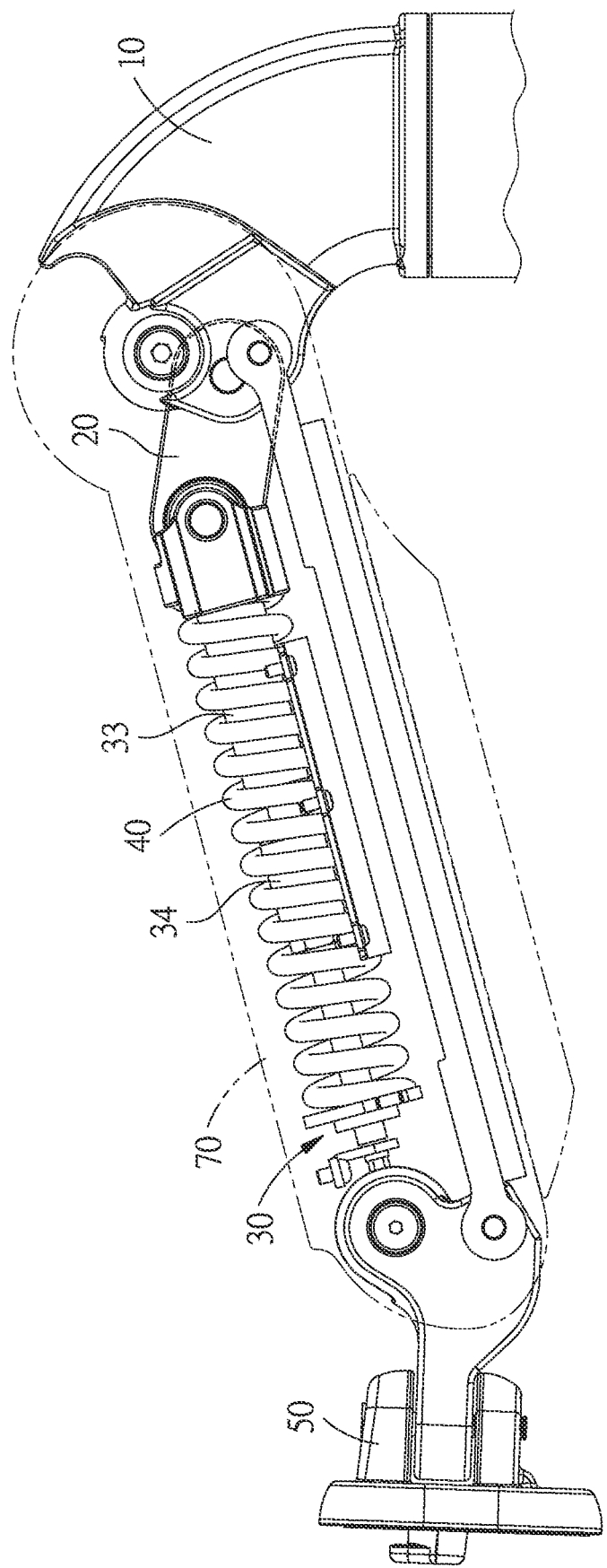
FIG. 5 is a side view of the present invention in a first state.
Figure 6:
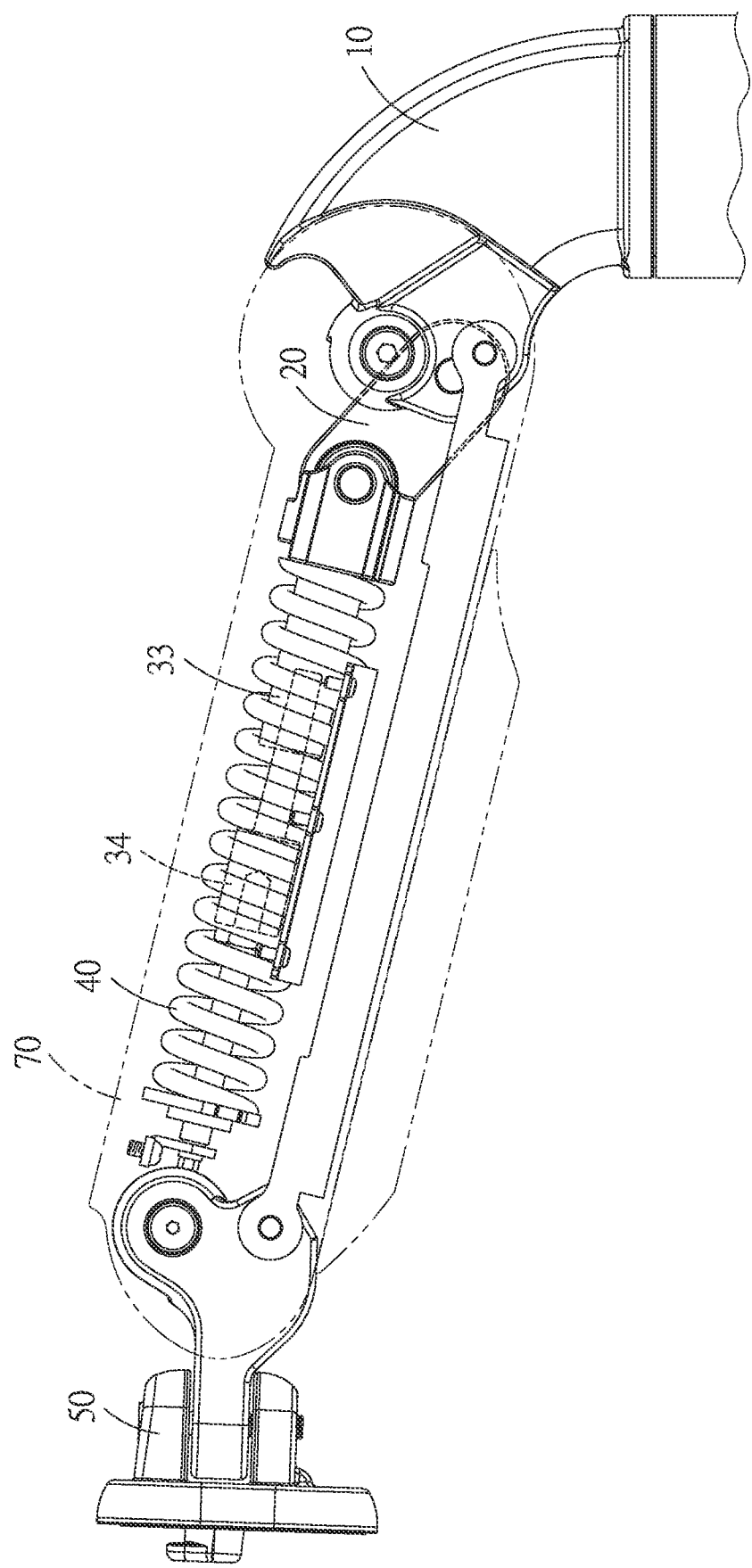
FIG. 6 is a side view of the present invention in a second state.

The above is a structural configuration and a connection relationship thereof in a preferred embodiment, and the usage of the present invention is as follows:

Referring to FIGS. 5 and 6, when the user wants to adjust the position of the hanging mount 50, he/she can pull the hanging mount 50 to make the first and second struts 30, 60 pivot. Since the two ends of the second strut 60 are respectively pivotally connected to the base 10 and the hanging mount 50, the first strut 30 can be extended and retracted along the telescopic direction X, when the second strut 60 pivots, the first sliding member 91 and the second sliding member 92 on the pivot block 20 will also be pivoted on equal degrees.

Figure 7:
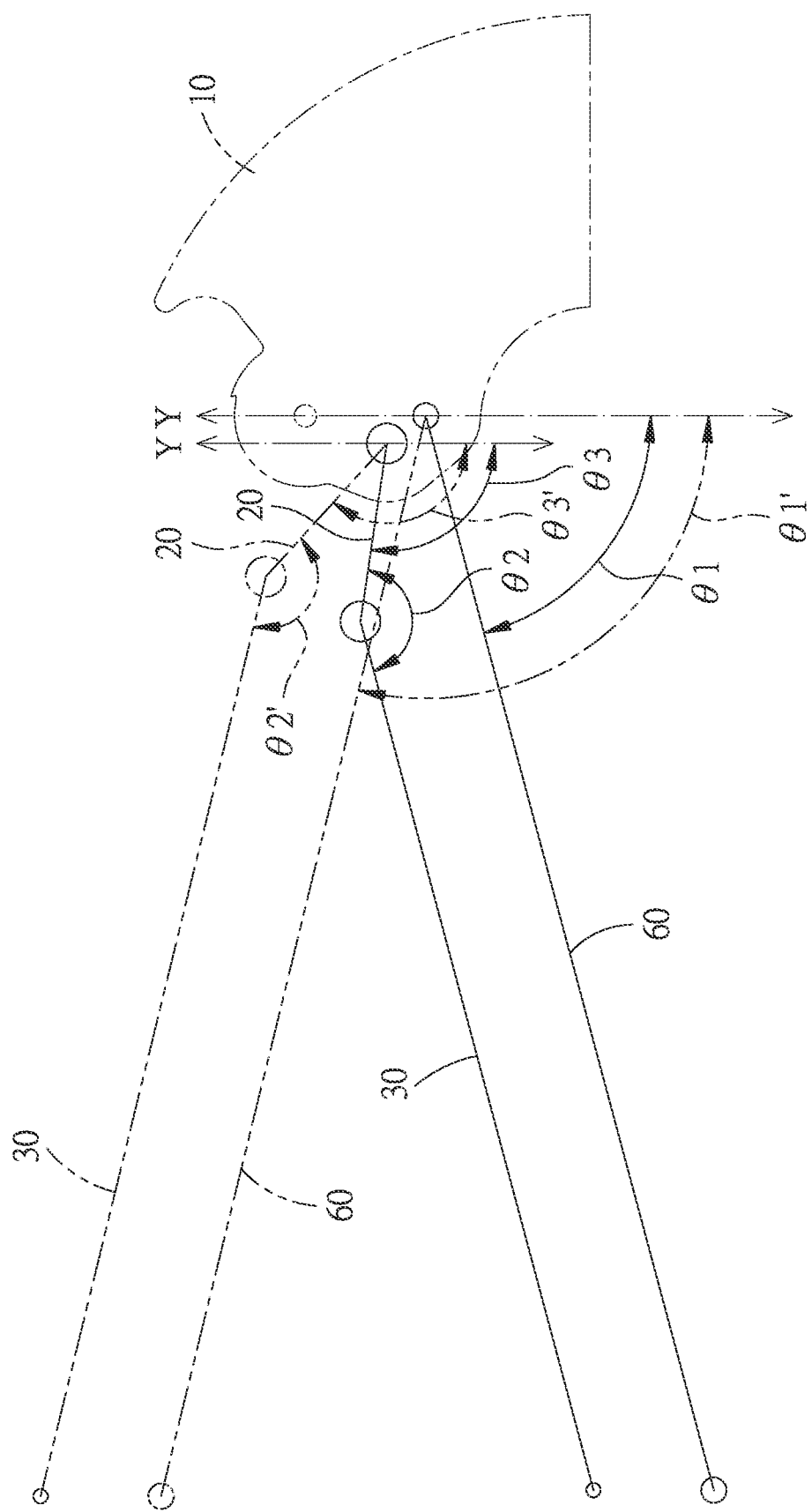
FIG. 7 is a simplified schematic view of the structure of the present invention.

Referring to FIG. 7, for example, the second strut 60 and the base 10 define a first angle θ1 therebetween along a vertical direction Y, the pivot block 20 and the first strut 30 define a second angle θ2, and the pivot block 20 and the base 10 define a third angle θ3 along the vertical direction Y.

When the user pulls the hanging mount 50 to make it pivot upward by 30 degrees, the telescopic member 34 extends a little into the sleeve hole 331, so that the first strut 30 and the second strut 60 can be pivoted smoothly, and the first angle θ1 between the second strut 60 and the base 10 is increased by 30 degrees to form a second-state first angle θ1'. Since the first and second sliding members 91, 92 pivot on equal degrees, the second angle θ2 between the pivot block 20 and the first strut 30 is increased by 15 degrees to form a second-state second angle θ2', and the third angle θ3 between the pivot block 20 and the base 10 is increased by 15 degrees to form a second-state third angle θ3'. The first strut 30 in fact only pivots by 15 degrees, so that the length of the elastic member 40 sleeved on the first strut 30 is actually stretched by pivoting of the first strut 30 by 15 degrees only, thereby reducing the degree of stretching of the elastic member 40, and preventing elastic fatigue of the elastic member 40.

More preferably, with the first and second sliding members 91, 92, the process of rotating the first strut 30 is smoothed, thereby preventing over rotation of the first strut 30 caused by excessive force during rotation, maintaining the performance of the elastic member 40 in a more excellent condition.

While we have shown and described various embodiments in accordance with the present invention, it is clear to those skilled in the art that further embodiments may be made without departing from the scope of the present invention.

What is claimed is:

1. A support frame, comprising:
    a base;
    a pivot block having a first pivot hole and a second pivot hole, and being pivotally connected to the base via the first pivot hole, wherein a first sliding member is provided in the first pivot hole, and a second sliding member is disposed in the second pivot hole, each of the first sliding member and the second sliding member is a bearing;
    a first strut having a first end portion and an opposite second end portion, wherein the first end portion is pivotally connected to the pivot block via the second pivot hole;
    an elastic member sleeved on the first strut;
    a hanging mount pivotally connected to the second end portion; and
    a second strut having one end pivotally connected to the base and another end pivotally connected to the hanging mount, wherein the base has a bottom member placed on a table top or fixed to a wall surface, and a pivoting member, the bottom member has a top surface facing the pivoting member, the top surface has an annular groove, the pivoting member has a bottom surface facing the bottom member, the bottom surface is provided with a positioning hole, a positioning post has one end inserted into the positioning hole and another end inserted into the annular groove.

2. The support frame as claimed in claim 1, wherein the elastic member is a contraction spring.

3. The support frame as claimed in claim 1, wherein the first strut has a sleeve and a telescopic member, the sleeve has a sleeve hole extending along a telescopic direction and having an open end, the telescopic member is movably disposed in the sleeve hole along the telescopic direction, and the first end of the first strut is pivotally connected to the pivot block via the second pivot hole.

4. The support frame as claimed in claim 1 further comprising an outer casing which has two ends pivotally connected to the hanging mount and the base, respectively, and a connecting portion is protruded from the first strut and fixed to the outer casing.

\* \* \* \* \*